United States Patent [19]
Khan

[11] Patent Number: 5,286,049
[45] Date of Patent: Feb. 15, 1994

[54] VEHICLE RUNNING BOARD

[75] Inventor: Shahid R. Khan, Champaign, Ill.

[73] Assignee: Flex-N-Gate Corporation, Urbana, Ill.

[21] Appl. No.: 774,711

[22] Filed: Oct. 9, 1991

[51] Int. Cl.$^5$ ............................................... B62B 9/16
[52] U.S. Cl. ....................................... 280/163; 280/169
[58] Field of Search ................................ 280/163, 169

[56] References Cited

U.S. PATENT DOCUMENTS

| | | | |
|---|---|---|---|
| 249,501 | 3/1877 | Chapman . | |
| 257,250 | 5/1878 | Stoltenbert et al. . | |
| 277,470 | 9/1882 | Matti . | |
| 278,329 | 1/1883 | Baker et al. . | |
| 297,230 | 12/1886 | Huff . | |
| 2,084,014 | 6/1937 | Bronson | 280/169 |
| 2,088,739 | 8/1937 | Geyer | 280/163 |
| 2,214,048 | 9/1940 | Edwards | 280/169 |
| 3,684,311 | 8/1972 | Pierce | 280/163 |
| 4,021,055 | 4/1976 | Okland . | |
| 4,203,611 | 5/1980 | Makeza | 280/163 |
| 4,257,620 | 11/1978 | Okland . | |
| 4,311,320 | 1/1982 | Waters | 280/169 |
| 4,451,063 | 6/1982 | Snyder . | |
| 4,456,275 | 2/1982 | Snyder et al. . | |
| 4,463,962 | 2/1982 | Snyder . | |
| 4,557,494 | 12/1983 | Elwell . | |
| 4,836,568 | 9/1987 | Preslik et al. . | |
| 4,838,567 | 2/1988 | Michanczyk . | |
| 4,934,721 | 12/1988 | Flores . | |
| 4,935,638 | 4/1989 | Straka . | |
| 4,943,085 | 4/1989 | Straka . | |

Primary Examiner—David M. Mitchell
Attorney, Agent, or Firm—Wood, Phillips, VanSanten, Hoffman & Ertel

[57] ABSTRACT

A vehicle running board has an elongated two-piece deck assembly attached to a vehicle frame by means of a plurality of longitudinally spaced brackets connected between the underside of the deck and the vehicle frame. The deck assembly includes a metal running board platform and an overlying step pad formed of plastic and having a number of integrally molded resilient tabs for effectuating a snap fit engagement with the platform. Vinyl end caps are mounted to opposite ends of the deck assembly by a pin and post connector to provide a rigid connection capable of withstanding excessive use yet capable of accommodating thermal expansion and contraction of the running board components.

8 Claims, 2 Drawing Sheets

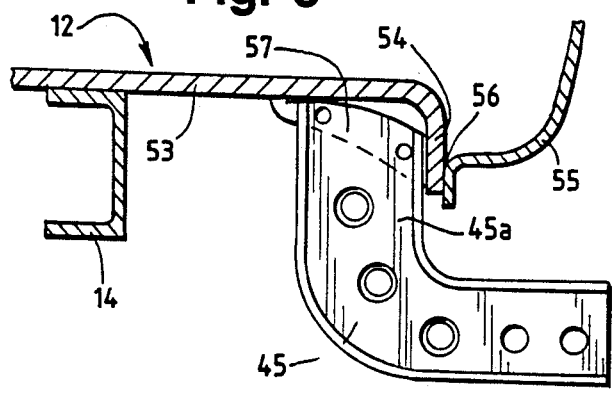
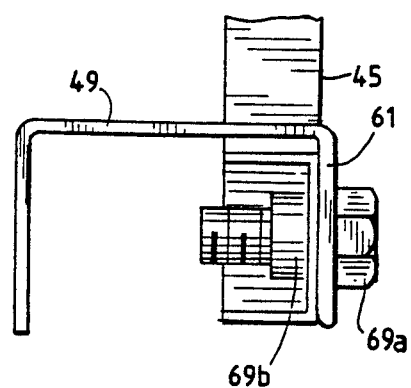
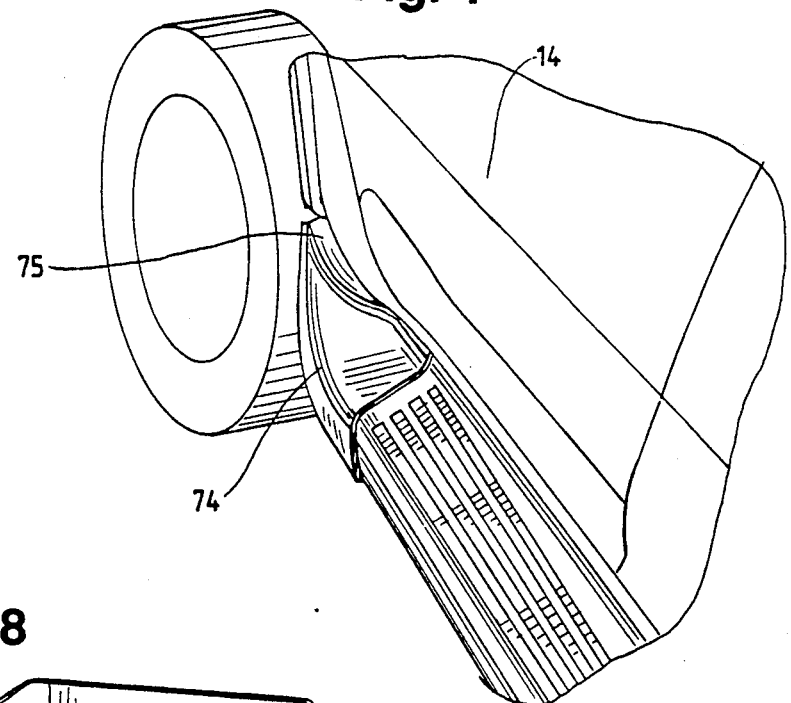
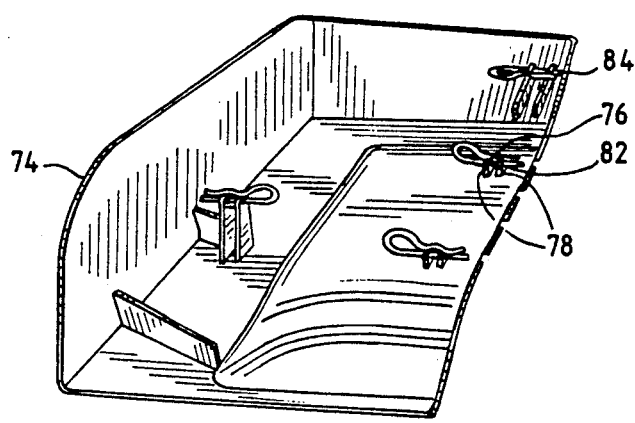

VEHICLE RUNNING BOARD

BACKGROUND OF THE INVENTION

1. Technical Field

The present invention is directed toward a running board for use with a motor vehicle, and more particularly toward an improved running board construction utilizing a combination of molded plastic and steel components.

2. Background Art

Conventional vehicles of the sport utility, pick-up truck, and van types frequently have running boards to facilitate entry and exit therefrom. Because of the often appreciable height differential between the cabs or passenger compartments of such vehicles and the ground level, running boards are mounted alongside vehicle frame below the door openings to provide a convenient step for individuals attempting to enter and leave the vehicle.

In order to support the weight of vehicle occupants standing on a running board, running boards are commonly formed of metal or wood and are rigidly secured to the vehicle frame. That is, structural rigidity is an important consideration in the selection of materials for running board construction. Although the use of such materials is reasonably effective to withstand the repeated loadings associated with frequent entry into and exit from vehicles, a number of significant problems exist.

During operation of a vehicle, running boards are continuously exposed to the rather abusive outdoor environment. Consequently, the running board step surface tends to accumulate rain water, ice, snow, mud, and various other materials. Because of the relatively low coefficients of friction of the above noted running board materials selected primarily on the basis of structure rigidity, the running boards can become slippery and footing is substantially degraded.

Running boards also enhance the aesthetic appearance of the vehicle. Commonly, a running board has highly polished chrome or colored surfaces which are coordinated with the vehicle body panels. Due to the repeated foot traffic to which a running board is subjected, however, the surfaces can become scuffed and the paint can be scratched and chipped.

An additional aesthetically pleasing feature of running boards is a smooth blending of the running board ends into the vehicle body contour. Typically, the end edges of the running board are rounded and blended integrally into the vehicle body, with the running board ends abutted against the vehicle and secured by means of rigid clamps.

Because of the rigid connection between the running board ends and the vehicle body, significant stresses can occur in the vehicle body when the running board is subjected to thermal loading. That is, fluctuations in temperature cause expansion and contraction of the running board components. As the different components change size at different rates, the running board ends are force against or, alternatively, pulled away from the vehicle body. The rigid connection restricts the relative displacement of the running board ends and instead applies forces to the vehicle body.

The present invention is directed toward overcoming one or more of the problems set forth above.

SUMMARY OF THE INVENTION

It is an object, therefore, of the present invention to provide a new and improved vehicle running board utilizing a combination of molded plastic and steel components.

In the exemplary embodiment of the invention, a vehicle running board has an elongated two-piece deck assembly attached to the vehicle frame by means of a plurality of longitudinally spaced brackets connected between the underside of the deck and the vehicle frame. The deck assembly includes a metal running board platform and an overlying step pad formed of plastic for providing safe, sure footing as well as protection from scuffing of the metal platform. The step pad has a number of pairs of integrally molded depending resilient tabs which are received in corresponding openings in the running board platform to effectuate a snap fit construction of the deck assembly.

Vinyl end caps are mounted to opposite ends of the deck assembly to allow for vehicle body build deviations as well as to accommodate thermal expansion and contraction of the various running board components. The end caps are flared at their outer end to enhance the structural and aesthetic blending of the deck assembly into the vehicle body and to provide a guard for warding away gravel, mud, and other debris. An adjustable pin and post connection between the end caps and the deck assembly provides a firm connection of the end caps which is capable of withstanding abusive foot traffic while accommodating the expansion and contraction of the running board material.

A series of generally U-shaped brackets are welded to the underside of the running board platform in a downwardly opening orientation and have a pair of mutually parallel substantially vertically extending legs. A corresponding series of generally L-shaped brackets are mounted to the vehicle frame. Each L-shaped bracket has an upright leg attached to the frame and second leg extending beneath and substantially transverse to the deck for connection with one of the depending legs of a corresponding U-shaped bracket on the deck assembly.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, can be understood best by consideration of the following description taken in conjunction with the accompanying drawings, in which like reference numerals identify like elements in the figures and in which:

FIG. 5 is a section view taken along line 5—5 of FIG. 1 with the running board removed showing the vehicle structure to which the brackets of FIG. 4 are mounted;

FIG. 6 show one of the brackets mounted to a tie plate on the deck assembly;

FIG. 7 shows a portion of the running board mounting a flared end cap; and

FIG. 8 shows the underside of an end cap and indicates the location of four pin-and-post connections.

DESCRIPTION OF THE PREFERRED EMBODIMENT

Figure 1:
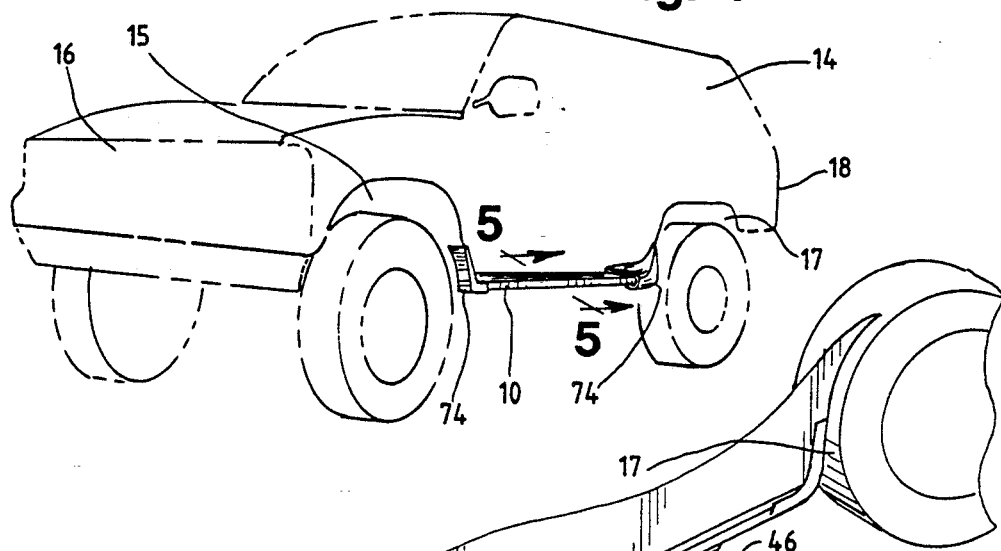
FIG. 1 is a perspective view of a vehicle having a running board according to the present invention mounted along the driver's side of the vehicle.
Figure 2:
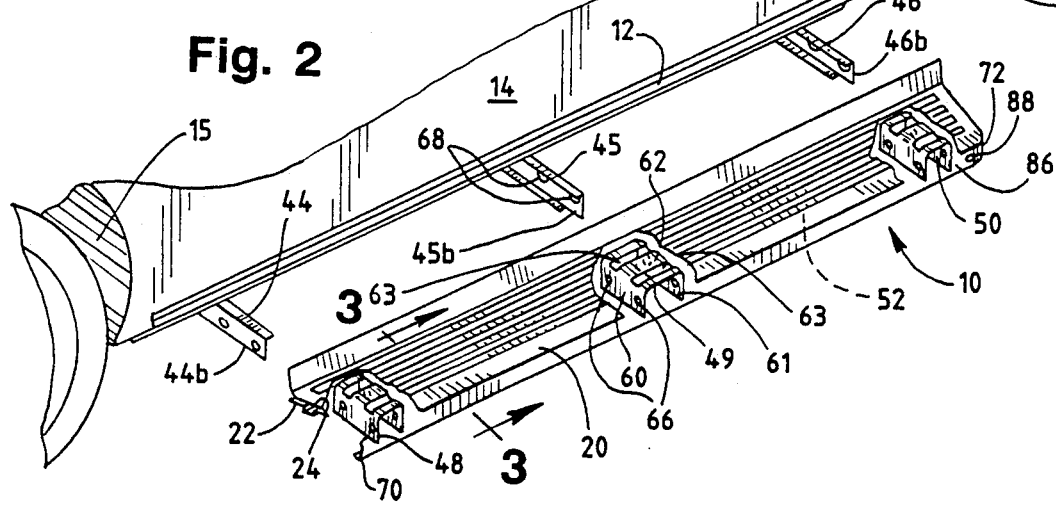
FIG. 2 is a diagrammatic illustration of the running board of FIG. 1 shown disconnected from a vehicle frame.

Referring now to the drawings, wherein like identical or corresponding reference numerals designate parts throughout the several views, FIGS. 1 and 2 show a running board, generally designated 10, for mounting to the frame 12 (see FIG. 5) of a vehicle 14. The running board 10 extends generally from a forward wheel well 15 at a front end 16 of the vehicle 14 to a rearward wheel well 17 at the rear end 18 of the vehicle 14. Thus, the running board 10 provides a platform capable of supporting an individual at a height above the ground substantially aligned with the floor of the passenger compartment and, thus, serves to provide a convenient step for facilitating entry and exit from the vehicle 14.

Figure 3:
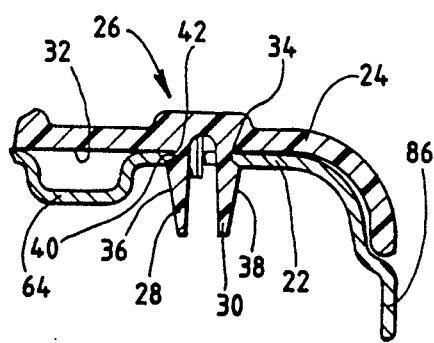
FIG. 3 is a sectional view taken along line 3—3 of FIG. 2 showing the construction of the deck assembly.

Referring also to FIG. 3, the running board 10 has an elongated two piece deck assembly 20 made up of a rail 22 and a step pad 24. The rail 22 is preferably formed of steel and extends over the entire length of the deck assembly 20 to define a running board platform for supporting the overlying step pad 24. The step pad 24 is preferably made of a plastic having a relatively high coefficient of friction and engaged with the underlying platform 22 by means of a resilient snap fit connection, shown generally at 26 in FIG. 3. In operation, the steel running board platform provides sufficient structural integrity to support entering and exiting vehicle occupants, while the relatively high friction plastic step pad improves footing and protects the steel components from scuffing and scratching. Additionally, the step pad can be easily molded to included channels or grooves for directing moisture toward the running board ends.

The resilient connection 26 includes a pair of spaced apart elastic legs 28 and 30 molded integrally with the step pad 24 and depending in a substantially vertical orientation from an underside 32 thereof. The resilient legs 28 and 30 are received in an opening 34 through the running board platform 22. Each of the legs 28 and 30 has a tapered surface 36 and 38, respectively, to facilitate the insertion of each of the legs in the opening 34. As the legs are inserted through the opening, engagement of the tapered surfaces 36 and 38 with the running board platform causes elastic deformation of the legs. Once the legs are fully inserted into opening 34, the resilient legs snap outwardly such that the groove 42 on the legs 28 is biased into engagement with a lip 40 of the opening 34.

While only a single snap connection 26 is illustrated in FIG. 3, it should be understood that the present invention fully comprehends the provision of a plurality of connections 26 spaced along the length of the deck assembly 10, with the specific number of connections depending on the length of the running board used. The simple snap connection of the step pad to the platform facilitates assembly of the running board deck assembly and reduces the time and effort required to install the running board on a vehicle frame.

In order to mount the deck assembly 20 to the vehicle 14, a number of running board brackets 44, 45 and 46 and a number of respectively associated tie plates 48, 49 and 50 are provided. As will be described below, the brackets 44, 45, and 46 are rigidly attached to the vehicle frame 14 while the tie plates 48, 49 and 50 are mounted to the underside 52 of the running board platform 22. Connection of the running board brackets 44, 45 and 46 with the associated tie plates 48, 49 and 50 is thus effective to secure the deck assembly 20 to the vehicle 14.

Figure 4:
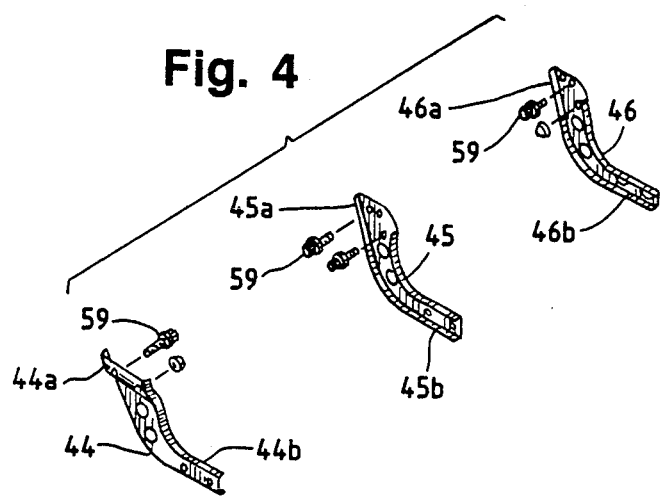
FIG. 4 illustrates three generally L-shaped brackets for mounting the deck assembly to the vehicle frame.

As best illustrated in FIG. 4, the running board brackets comprise generally L-shaped metal links each having a respective upstanding portion 44a, 45a, 46a engageable with the vehicle 14.

Particularly, and as shown in the sectional view of FIG. 5 with respect to running board bracket 45 only, the vehicle frame 12 comprises a longitudinally extending frame rail 14 supporting a generally horizontal vehicle floorboard 53. A downturned lip 54 is formed along one edge of the floorboard 53 and is secured to an upwardly extending vehicle body panel 55 by means of a pinch weld 56. An angled attachment plate 57 is welded to the underside of the floorboard 53 in abutting relation with the downturned lip 54. The attachment plate 57, along with additional plates (not shown) which are longitudinally spaced along the floorboard 53, typically are installed by the vehicle producing factory during manufacture of the vehicle. Each of the bracket portions 44a, 45a and 46a have mounting holes through which threaded fasteners, such as bolts 59, then are inserted and engaged with corresponding nuts (nut shown) to rigidly attach the brackets to the attachment plates on the vehicle frame 12.

The running board brackets 44, 45 and 46 also have associated generally horizontally extending legs 44b, 45b and 46b, respectively, which extend beneath and substantially transverse to the deck assembly 20. As shown in FIG. 1, the bracket portions 44b, 45b, 46b extend laterally from the underside of vehicle 14 and define a generally planar support surface for mounting the deck assembly 20 in a substantially horizontal orientation adjacent the vehicle 14.

The running board tie plates 48, 49 and 50 are substantially similar structures, and for that reason, will be described only with respect to the tie plate 49. While only the tie plate 49 is specifically described, it is believed that one of ordinary skill in the art could easily extend the following description by analogy to the tie plates 48 and 50 .

The running board tie plate 49 is a generally U-shaped bracket secured in a downwardly opening relationship to the underside 52 of the running board platform 22. Preferably, each mounting bracket is welded to the underside of the platform. The tie plate 49 includes a pair of substantially parallel depending flanges 60 and 61 separated by a central bracket portion 62. The tie plate has a number of grooves or cutouts 63 formed in the bracket portion 62 and extending in substantially parallel relation to the deck assembly 20. The grooves 63 are engageable with longitudinal ribs 64 (see FIG. 3) formed in the running board platform 22 to facilitate the alignment of the tie plate 49 with the deck assembly 20.

To install the deck assembly 20 to the frame-mounted brackets 44, 45 and 46, the deck assembly, along with the underlying tie plates 48, 49 and 50 which are welded thereto, are moved into overlying engagement with the bracket ends 44b, 45b and 46b, with the bracket ends received between the flanges 60 and 61 and the deck assembly 20 supported thereon. Mounting holes 66 formed in the brackets 44, 45 and 46 are aligned with corresponding mounting holes 68 formed in the tie plates 48, 49 and 50. Threaded fasteners, such as bolts 69a (one shown in FIG. 6) are inserted through the aligned mounting holes and engaged with corresponding nuts 60b to rigidly secure the deck assembly 20 to the vehicle 14.

In order to integrate opposite ends 70 and 72 of the running board 10 with the vehicle body in such a way that loads applied to the running board are isolated from the vehicle, detachable end caps 74 (see also FIGS. 7 and 8) are mounted on the deck assembly 20 and interposed between the running board 10 and the vehicle body. Optionally, a vinyl gasket 75 is inserted between each end cap 74 and the vehicle body.

Each end cap 74 comprises a flared vinyl structure and is connected to the running board ends by means of a number of pin and post connections 76. The flare can incorporate or be used in place of generally well-known mud guards to ward away gravel and other road debris.

Each pin and post connection 76 includes a number of pairs of spaced apart tabs 78 integrally molded with and extending from the underside 80 of the end cap 74. Each pair of tabs 78 have a mutually aligned opening 82 extending therethrough for receiving a detachable pin 84.

Referring back to FIG. 2, the steel running board platform 22 has a downturned lip 86 extending around the periphery of the running board. A number of rectangular slots 88 (one shown in FIG. 2) are punched through the downturned lip 86 near the running board ends 70 and 72 in an arrangement complementary to the arrangement of pine and post connections 76 on the underside of the end caps 74. To mount an end cap 74 to an end of the deck assembly 20, the end cap is placed over the end of the assembly with each of a pair of associated tabs 78 extending through a rectangular slot 88. A pins 84 is then inserted through the aligned openings 82 in the tabs 78 to securably connect the end cap 74 and the deck assembly 20.

The aforesaid construction of a vehicle running board provides a new and improved apparatus providing significant advantages over existing designs. Due to the combination of the plastic step pad and metal running board platform, the structural integrity of the running board is sufficient to support entering and exiting vehicle occupants while providing sure footing and protection of the steel components from scuffing and scratching. The simple snap connection between the step pad and the platform facilitates assembly of the running board deck assembly and reduces the time and effort required to install the running board on a vehicle frame.

The separate vinyl end caps isolate the running board and the vehicle body such that engine vibration transmitted through the vehicle frame is not transferred through the running board to the vehicle body. The convenient pin and post connections provide an aesthetically pleasing, firm connection of the end caps with the running board while accommodating thermal expansion and contraction.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A running board for mounting to the underbody of a vehicle comprising:

an elongated deck;
first bracket means for attaching the elongated deck to the underbody, the first bracket means extending beneath and substantially transverse to the deck and having a portion attachable to the vehicle underbody; and
second bracket means on the deck for engagement with the first bracket means, the second bracket means comprising at least one generally U-shaped bracket fixed in a downwardly opening orientation to the underside of the deck, the bracket having at least one substantially vertically extending leg engageable with the first bracket means to mount the running board to the underbody,
the second bracket means having grooves extending in substantially parallel relation to the deck, the underside of the deck having longitudinally extending ribs engaged with the grooves to facilitate the alignment of the second bracket means with the deck.

2. The running board of claim 1 in which the second bracket means comprises a plurality of U-shaped brackets spaced along the length of the deck and engaged with corresponding first bracket means attached to the frame.

3. The running board of claim 1 in which the first bracket means comprises at least one generally U-shaped bracket having a first leg attachable to the frame and second leg extending beneath and substantially transverse to the deck, the second leg being connected the U-shaped bracket of the second bracket means.

4. The running board of claim 1 in which the deck comprises a first platform formed of metal and a second platform formed of plastic supported in overlying relation with the first platform, the first platform and the second platform including means for defining a snap connection therebetween.

5. A running board for mounting to the underbody of a vehicle comprising:

an elongated two-piece deck having spaced apart ends and including a first platform formed of metal and a second platform formed of plastic supported in overlying relation with the first platform, the first platform and the second platform having means for defining a snap connection therebetween;
first bracket means for attaching the elongated deck to the underbody, the first bracket means extending beneath and substantially transverse to the deck and having a portion attachable to the vehicle underbody;
second bracket means secured to the underside of the deck for engagement with the first bracket means; and
at least one end cap engaged with the deck and disposed between one of said deck ends and the vehicle to isolate the vehicle from loading applied to the running board,
the end cap having connector means on the underside thereof for releasable engagement with the deck,
said connector means including a pair of spaced apart tabs on the end cap, and the deck having a number of spaced apart slots for receiving a pair of tabs and associated one with each pair, the connector means also including a pin releasably engageable with the tabs to prevent the tabs from being withdrawn from the associated slots.

6. The running board of claim 5 in which the end cap is formed of plastic or vinyl.

7. The running board of claim 5 in which the end cap has a first end engageable with the deck and a flared second end in abutting relation with the vehicle.

8. The running board of claim 5 in which the spaced apart tabs on the end cap have a mutually aligned opening therethrough, the pin passing through each of the openings to releasably connect the end cap and the deck.

* * * * *